J. SIMON.
PULL BELT FOR STALLED AUTOMOBILES.
APPLICATION FILED MAR. 24, 1921.
1,430,471. Patented Sept. 26, 1922.
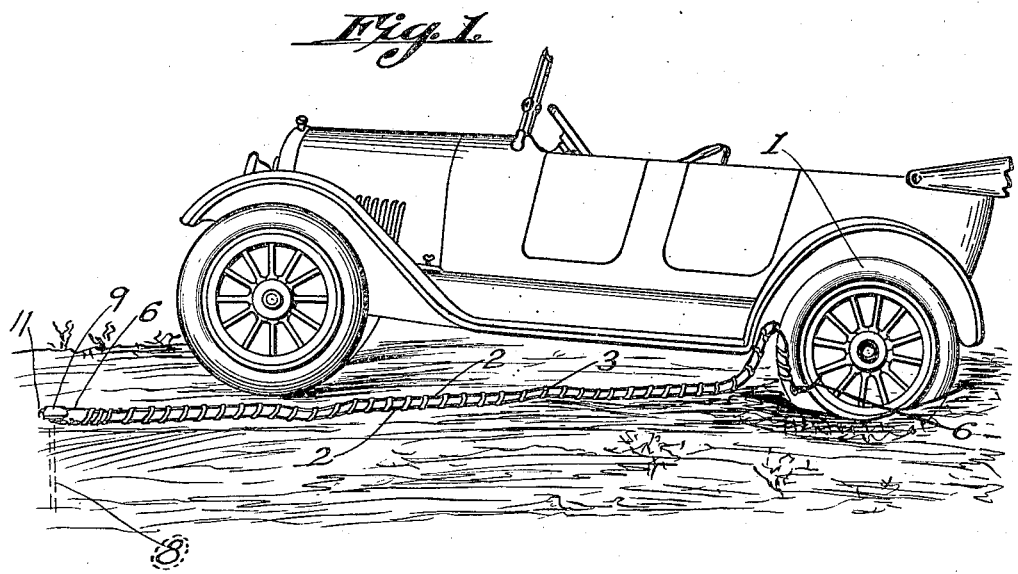
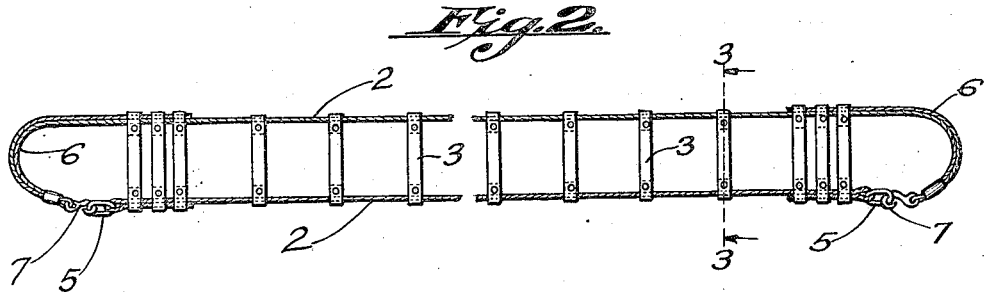
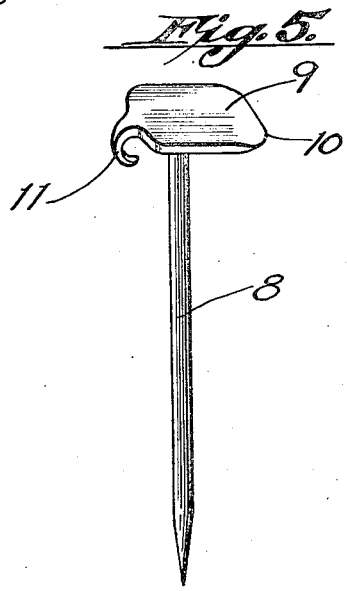
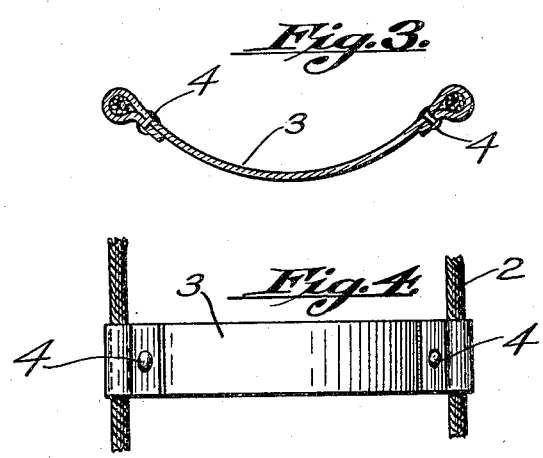
Inventor
John Simon.
By Hazard & Miller
Attorneys Patented Sept. 26, 1922.

1,430,471

UNITED STATES PATENT OFFICE.

JOHN SIMON, OF GARDENA, CALIFORNIA.

PULL BELT FOR STALLED AUTOMOBILES.

Application filed March 24, 1921. Serial No. 455,297.

*To all whom it may concern:*

Be it known that I, JOHN SIMON, a citizen of the United States, residing at Gardena, in the county of Los Angeles and State of California, have invented new and useful Improvements in Pull Belts for Stalled Automobiles, of which the following is a specification.

It is the object of this invention to provide an improved mechanism adapted to be attached to a driving wheel of an automobile which has become stalled and staked out upon the road in front of the stalled wheel, so that when power is applied to the wheel it will have the anchored mechanism wound upon the wheel in order to draw the latter from a mud hole or the like in which it is stalled.

The invention will be readily understood from the following description of the accompanying drawings, in which Figure 1 is a perspective view showing a stalled automobile with the improved mechanism in position for use.

Fig. 2 is a plan view of the traction belt forming a part of the device.

Fig. 3 is a transverse section on the line 3—3 of Fig. 2.

Fig. 4 is a plan view of a portion of the traction belt showing the construction of the same.

Fig. 5 is a perspective view of the stake employed for anchoring the traction belt.

In the drawings I have shown one of the drive wheels 1 of an automobile stalled in a mud hole, or the like in a road.

The improved mechanism includes a traction belt staked to the ground in front of the stalled wheel and attached to the wheel. The traction belt which is thus staked to the ground may include flexible side members 2 shown as wire cables and having cross pieces 3 connecting the same. These cross pieces are preferably of metal transversely curved, as clearly shown in Fig. 3, and having their ends looped around the cables 2 and secured in position as by the rivets 4. The cross pieces 3 are preferably equally spaced along the length of the traction belt with a plurality of such cross pieces arranged close together at the respective ends of the traction belt.

One end of the traction belt is secured to a suitable stake driven into the road in front of the stalled wheel, while the opposite end of the belt is secured to the stalled wheel. As an instance of the connecting means formed at the ends of the traction belt, one of the cables 2 may terminate at each end of the traction belt in a ring 5, while the ends of the other cable 2 form loops 6. These loops are adapted to be received around a stake, and around the wheel rim, respectively, and the ends of loops 6 are provided with hooks 7 adapted to engage in the rings 5.

As previously stated the connecting means at one end of the traction belt is received around the rim of the stalled wheel and secured in position with the traction belt staked out upon the road in front of the stalled wheel.

The traction belt is anchored in position by means of a stake 8 driven into the road and having the loop 6 at the far end of the traction belt received around the same. The stake 8 is preferably provided with a flattened head 9 to permit of readily inserting the same in the road, and the edge of this head which is turned toward the stalled wheel is preferably tapered as shown at 10 so as to form no impediment to the passage of the stalled wheel when the latter is drawn to the stake, by applying power to the stalled wheel so as to wind the traction belt staked out upon the road, onto the wheel. In order to adequately anchor stake 8 is may also be provided with a depending hook 11 at the side of head 9 which is opposite the stalled wheel, said hook through its engagement in the ground, forming means for preventing lateral displacement of the stake.

It will thus be seen that I have provided extremely simple means for pulling a stalled wheel from a mud hole or the like, said means including a traction belt anchored to the road in front of the stalled wheel and connected at its end to said wheel, so that when power is applied for rotating the wheel, the belt will be wound upon the wheel and thereby draw the wheel from the mud hole.

Various changes may be made without departing from the spirit of the invention as claimed.

What is claimed is:

A pull belt for stalled automobiles comprising parallel cables, both ends of both of said cables being doubled, a series of transversely disposed metal plates having their ends secured to the doubled ends of both cables, a series of transversely disposed metal plates secured to the cables between their doubled ends, rings carried by the doubled ends of one of said cables and hooks carried by the doubled ends of the other cable.

In testimony whereof I have signed my name to this specification.

JOHN SIMON.